United States Patent [19]
Watanabe et al.

[11] 3,872,481
[45] Mar. 18, 1975

[54] REMOTE CONTROL OF CAMERA BUILT-IN LIGHT MEASURING DEVICE

[75] Inventors: Koichiro Watanabe, Funabashi; Akihiro Arai, Tokyo, both of Japan

[73] Assignee: Asahi Kogaku Kogyo Kabushiki Kaisha, Tokyo-to, Japan

[22] Filed: Aug. 31, 1973

[21] Appl. No.: 393,394

[30] Foreign Application Priority Data
Sept. 7, 1972  Japan................... 47-103641

[52] U.S. Cl.................. 354/23, 354/202, 354/295
[51] Int. Cl................... G03b 17/00, G03b 17/38
[58] Field of Search.... 95/10 C, 10 CT, 53 R, 53 E; 354/23, 266, 295, 29, 30, 202

[56] References Cited
UNITED STATES PATENTS

| | | | |
|---|---|---|---|
| 3,418,479 | 12/1968 | Schmitt | 95/10 CT X |
| 3,424,071 | 1/1969 | Schwahn | 354/295 |
| 3,460,450 | 8/1969 | Ogiharu | 95/10 CT |
| 3,518,927 | 7/1970 | Mehlitz et al. | 354/30 |
| 3,548,732 | 12/1970 | Rentechler | 95/10 CT X |
| 3,614,918 | 10/1971 | Henning et al. | 95/10 C |

*Primary Examiner*—Joseph F. Peters, Jr.
*Attorney, Agent, or Firm*—Christie, Parker & Hale

[57] ABSTRACT

A connector is provided for a camera having a built-in light measuring device that is energized by built-in battery through closure of a built-in switch, the connector being connected to the switch. There is provided an external switch, preferably mounted in a box which also contains a release station for remote control of the camera shutter release. A cord is connectable between the external switch and the connector whereby the external switch provides for remote control of the energization of the light measuring device.

2 Claims, 1 Drawing Figure

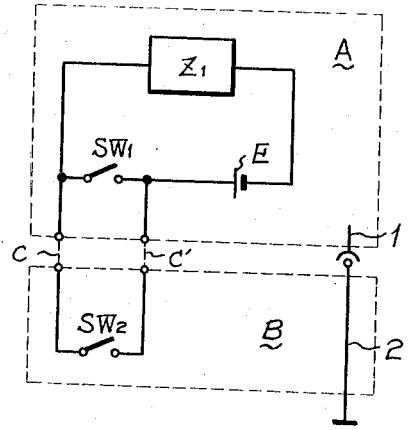

REMOTE CONTROL OF CAMERA BUILT-IN LIGHT MEASURING DEVICE

BACKGROUND OF THE INVENTION

It has been widely appreciated as useful to provide a photographic camera with a built-in exposure meter. Very popular also are the high-class cameras which include a built-in automatic exposure control device. As used herein, a light measuring device includes both an exposure meter and also includes an automatic exposure control device. A power source for a light measuring device is usually realized in a form of a super-miniature battery. To minimize the drain on the battery, it is preferable that a switch be provided for switchably connecting the battery to the light measuring device. The resulting electrical circuit including the switch is normally open in order to save on power consumption and is closed only during the time it is desired to operate the light measuring device. Furthermore, it has been required that the electric circuit be closed by a simplified operation and only for the short time of the light measuring period. To this end, there have already been suggested various switching arrangements for this purpose. These switching arrangements have been operatively associated with, for example, operation of a film transport lever, a self-timer lever, a shutter release, and the like. However, these prior art approaches provide control only in the condition wherein the camera is directly held by hand, and it has usually been impossible to operate these switching arrangements from a remote point. Thus, when a remote release device (such as a cable release and an electric film transport device) is used, the operation of these switching means has been attended with an extreme complexity as when an accessory grip or the like was used.

SUMMARY OF THE INVENTION

The basic object of the present invention is to improve controllability for light measuring when this light measuring is effected under remote control (control at a location remote from an operating location peculiar to the camera, inclusive of operation of a grip directly connected to an electric film transport device) and to save consumption of the power source.

In accordance with this invention, a first switch is arranged within a camera body to activate an electric circuit for light measuring. A second switch is arranged outside the camera body to activate this electric circuit for light measuring within the camera body so that operation of light measuring may be remotely controlled.

BRIEF DESCRIPTION OF THE DRAWING

The accompanying drawing is a circuit diagram showing an embodiment of the device according to the present invention.

DETAILED DESCRIPTION

In a drawing, an electric circuit Z1 is a conventional light measuring device and includes a circuit for indication. There is a first switch $SW_1$ inserted into an electric circuit adapted to energize electric circuit Z1 from a power source E. On the camera body there is a connector including contacts C and C' which are electrically connected to opposite sides of the switch $SW_1$. Preferably, the contacts are arranged on a sidewall of the camera body A. A remote control device B, separate from the camera body A, is provided with a second switch $SW_2$ which has, in turn, contacts C and C' on opposite sides thereof so as to be connected by cords with said contacts C and C' of the camera body A, respectively. The function of this remote control device B is to remotely control operation of the camera for photographing (such as film transport and shutter release) and includes therein a remote release control station 2 which is cord-connected to a remote release socket 1 of the camera body A.

Light measuring is accomplished through the first switch $SW_1$ when operation of light measuring is performed independently by the camera body. When the remote control device B is mounted, the electric contacts C and C' are connected and the second switch $SW_2$ is closed for light measuring. It should be noted here, that in the latter case, light measuring may be accomplished also through the first switch $SW_1$ on a camera side.

The remote release device is schematically shown since these devices are well known in the prior art. Release is effected by pushing the remote release socket 1 on the camera side with the remote release control station 2.

It is clear that the second switch $SW_2$ may be set to be independently operated as well as successfully operated in operative association with the remote release control station 2 by positioning closure of the second switch $SW_2$ before activation of release.

As seen from the foregoing description, the device according to the present invention is remarkably effective in practice since it is possible to activate the circuit for light measuring only when necessary, even in remote control operation of the camera, and thereby to reduce the drain on the battery and to improve controllability, especially in a camera system in which an electric film transport and automatic exposure means are incorporated.

What is claimed is:

1. A switching device of an electric circuit for light measuring used with a photographic camera to be utilized for photometric indication or automatic exposure control, comprising a first switch arranged within a camera body to activate said electric circuit for light measuring and a second switch arranged outside the camera body in parallel circuit relationship with the first switch, so that the second switch is operative to activate said electric circuit for light measuring within the camera body so that operation of light measuring may be remote controlled.

2. In an arrangement which includes a camera having a camera body and an accessory grip therefor, the combination comprising:
   an electrical connector on the camera body;
   an electrically energizable light measuring device, a battery for energizing the light measuring device, and a first switch closable to energize the light measuring device with the battery, the light measuring device, the battery, and the first switch each being built into the camera, the first switch being electrically connected to the connector;
   a remote control switch arranged outside the camera body so as to be accessible while the grip is being held; and
   a cord for connecting the remote control switch to the connector and into parallel circuit relationship with the first switch so that energization of the light measuring device can be remotely controlled by the operation of the remote control switch.

* * * * *